United States Patent [19]

Kumar et al.

[11] Patent Number: 5,604,311
[45] Date of Patent: Feb. 18, 1997

[54] CORIOLIS EFFECT ROTATION RATE SENSOR AND METHOD

[75] Inventors: Lalit Kumar; Arthur R. Voros, both of Santa Barbara, Calif.

[73] Assignee: Litton Systems, Inc., Woodland Hills, Calif.

[21] Appl. No.: 480,218

[22] Filed: Jun. 7, 1995

[51] Int. Cl.⁶ .................................. G01P 9/04
[52] U.S. Cl. .................. 73/504.14; 73/504.02
[58] Field of Search .............. 73/504.02, 504.04, 73/504.12, 504.03, 504.14

[56] References Cited

U.S. PATENT DOCUMENTS

| | | | |
|---|---|---|---|
| 4,898,031 | 2/1990 | Oikawa | 73/504.14 |
| 4,930,351 | 6/1990 | Macy | 73/504.04 |
| 5,329,815 | 7/1994 | Dunn | 73/504.12 |
| 5,438,870 | 8/1995 | Zabler | 73/504.14 |

OTHER PUBLICATIONS

Anthony Lawrence, *Modern Inertial Technology*, Springer–Verlag, (1992), pp. 202–210, no month.
Anthony Lawrence, *Modern Inertial Technology*, Springer–Verlag, (1992), pp. 183–188, no month.
D. Considine, *Van Nostrand's Scientific Encyclopedia*, Seventh Edition, Van Nostrand Reinhold (1989), p. 773., no month.
Katsuhiko Ogata, *Modern Control Engineering*, Prentice–Hall, (1970), pp. 156, 182 and 183., no month.

Primary Examiner—Christine K. Oda
Attorney, Agent, or Firm—Robert E. Malm

[57] ABSTRACT

A monolithic Coriolis rate sensor includes a first member and a vibration generator that causes the member to vibrate along a first direction. At least one other member is mechanically coupled to the first member so that orthogonal vibrational modes are coupled to the other member when the members are rotated about a rotation axis. The vibrational mode coupling occurs as a result of the Coriolis effect. A vibration sensor is used to sense the orthogonal vibrational modes, the amplitude of which determines the rate at which the members are rotated. In a preferred embodiment, a central and two transverse end members with substantially equal resonant frequencies are mechanically coupled to form an "T"-shaped structure. The center member is vibrated at its resonant frequency, and orthogonal vibrational modes are coupled to the end members when the structure is rotated about a rotational axis that is orthogonal to both vibration directions. A tuning mechanism is also provided that allows for in-situ tuning of the members' resonant frequencies.

21 Claims, 6 Drawing Sheets

CORIOLIS EFFECT ROTATION RATE SENSOR AND METHOD

BACKGROUND OF THE INVENTION

1. Field of the Invention

This invention relates to rotation sensors, and more particularly to a rotation sensor and sensing method that utilizes the Coriolis effect.

2. Description of the Related Art

Devices currently used to measure rotation include Ring Laser Gyroscopes (RLGs) and Fiber Optic Gyroscopes (FOGs). RLGs and FOGs are based on the interference of two electromagnetic waves travelling in opposite directions within a closed optical loop. A rotation of the optical loop induces a phase difference between the two counter-propagating waves, which provides a measure of the rotation rate.

In a RLG, such as the one described in Anthony Lawrence, *Modern Inertial Technology*, Springer Verlag (1992), pp. 201–210, an active laser cavity is used as the sensing element. The cavity is pumped so that two counter-propagating electromagnetic waves are excited in the cavity. These waves optically interfere and produce a standing electromagnetic wave in the cavity. When the cavity is rotated with respect to inertial space, the standing wave rotates with respect to the RLG cavity. The differential motion between the RLG case and the standing wave produces a beat in the optical output of the cavity, with each beat representing a fixed measure of angular rotation.

Since the RLG is an active laser cavity, it must be carefully machined and precision optics must be used. In addition, the cavity must be purged of all contaminants and filled with a gain medium, such as a helium/neon gas mixture. These requirements make RLGs expensive and relatively large. Also, the RLG uses a large number of individual components (mirrors, anodes, cathodes, etc.), which reduce its operating life and reliability.

In a FOG, such as the one described in Anthony Lawrence, *Modern Inertial Technology*, Spinger Verlag (1992), pp. 183–188, the optical loop is formed from an optical fiber and the electromagnetic waves are provided by a solid-state laser. The optical fiber loop must be a precision-wound silica fiber coil. A phase modulator, optical coupler, polarizer and thermoelectric cooler are required. These components are spliced together in a highly precise fabrication process. The spliced components are packaged in another container to form the final assembled gyroscope. Like the RLG, the large number of components used in the FOG reduces its operating life and reliability. In addition, the highly precise fabrication process makes the FOG very expensive to manufacture.

SUMMARY OF THE INVENTION

In view of the above problems, a rotation sensor is provided that can be manufactured in bulk using inexpensive photolithographic techniques and that utilizes fewer individual components than prior rotation sensors.

This is accomplished by providing a first member and a vibration generator that causes the member to vibrate along a first direction. At least one other member is mechanically coupled to the first member so that orthogonal vibrational modes are coupled to the other member when the members are rotated about a rotation axis. The vibrational mode coupling occurs as a result of the Coriolis effect. The amplitudes of the orthogonal vibrational modes, which are measured with a vibration sensor, determine the rate at which the members are rotated.

In the preferred embodiment, three members with substantially equal resonance frequencies are mechanically coupled to form an "I"-shaped structure. The vertically extending member is vibrated along a first direction at its resonance frequency. The "horizontally" extending members are supported so that they will only vibrate along an orthogonal direction. Orthogonal vibrational modes are coupled to the horizontally extending members when the structure is rotated about a rotational axis that is orthogonal to both vibration directions.

The "I"-shaped structure is preferably a monolithic structure fabricated from a dielectric material with a high mechanical "Q", such as fused quartz. The structure is preferably coated with an electrically conductive material so that vibrations can be induced in the vertically extending member with a capacitive forcer electrode, and sensed in the vertically and horizontally extending members with capacitive pickoff electrodes.

These and other features and advantages of the invention will be apparent to those skilled in the art from the following detailed description of preferred embodiments, taken together with the accompanying drawings, in which:

BRIEF DESCRIPTION OF THE DRAWINGS

FIG. 2b is a sectional view taken along the section line 2b—2b of FIG. 2a.

FIG. 3 is an elevation view illustrating the preferred placement of capacitive pickoff electrodes for the embodiment of FIG. 2a.

FIG. 5 is an exploded perspective view illustrating a preferred enclosure and tuning mechanism for the embodiment of FIG. 2a.

DETAILED DESCRIPTION OF THE INVENTION

Figure 1A:
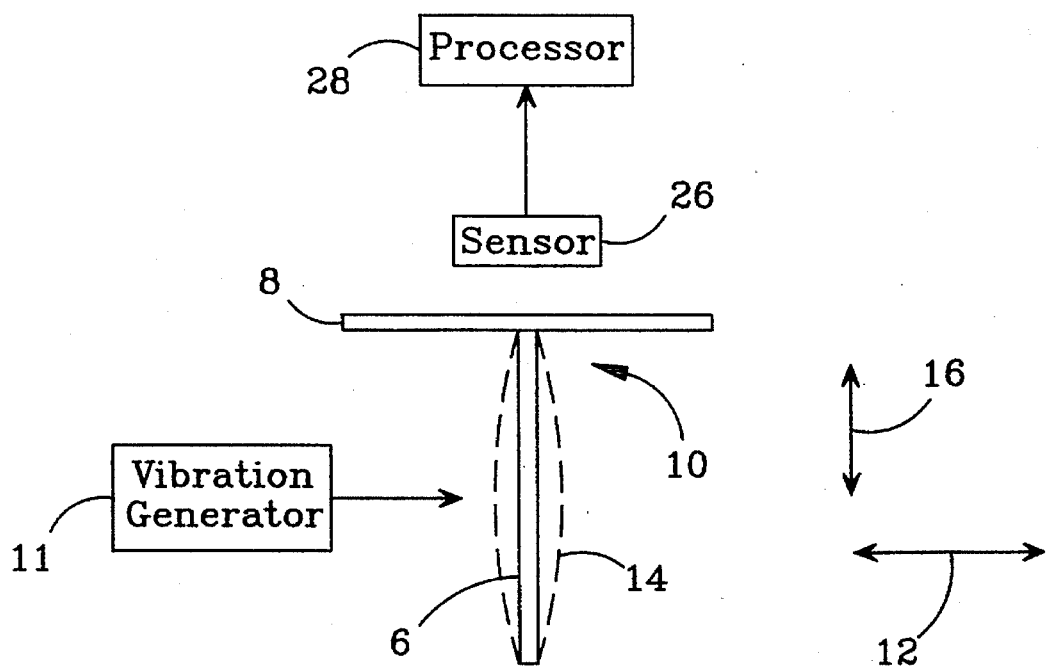
FIGS. 1a and 1b are block diagrams illustrating the basic principles of the invention.
Figure 1B:
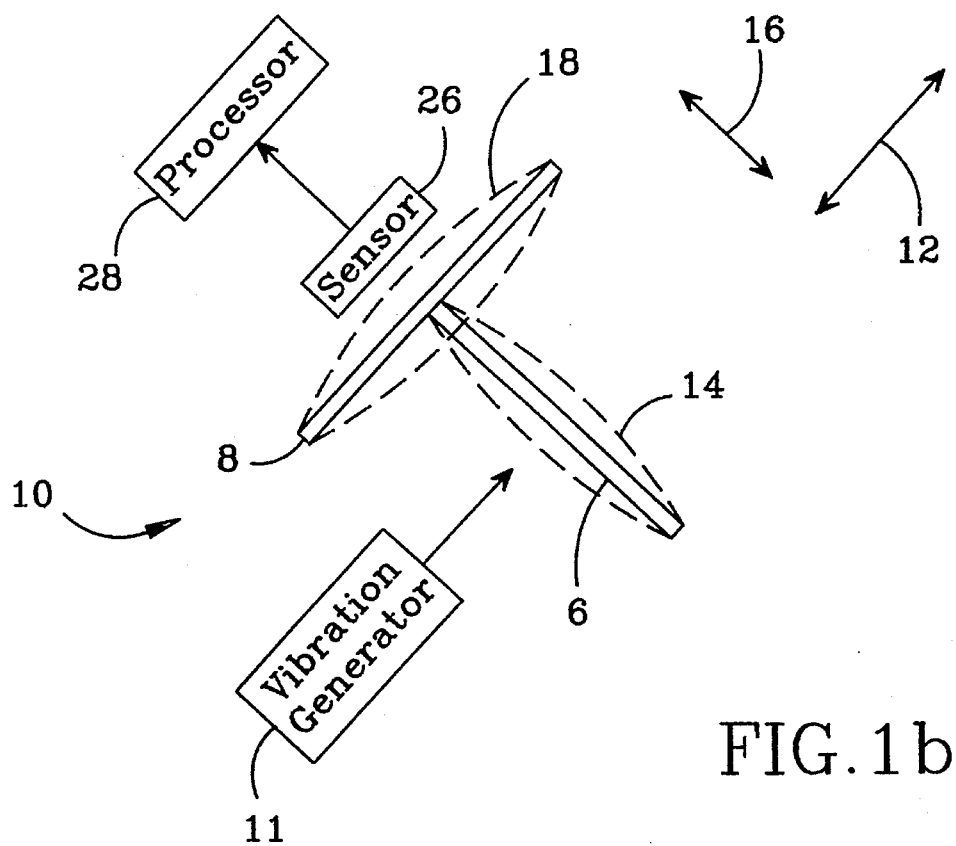

FIGS. 1a and 1b illustrate the basic principles of the invention. Referring first to FIG. 1a, a first member 6 is mechanically coupled to a second member 8 to form a mechanical structure 10. A vibration generator 11 induces vibrations in the first member 6 along an x-direction 12. Dashed line 14 represents the vibration induced displacement in member 6 along the x-direction 12. Member 8 is configured to only support vibrations along a y-direction 16, which is orthogonal to x-direction 12. Arrows 12 and 16 are used to illustrate directions x and y, respectively, which are defined relative to the structure's 10 frame of reference, so that the x and y directions 12 and 16 rotate with the structure.

When the structure 10 is rotated about a rotation axis that passes through the structure and that is orthogonal to directions 12 and 16, the vibrations in member 6 along direction 12 induce vibrations in the structure 10 along direction 16 through the Coriolis effect, as illustrated by dashed line 18 in FIG. 1b.

The Coriolis effect is a well known phenomena and is discussed in D. Considine, *Van Nostrand's Scientific Encyclopedia, Seventh Edition,* Van Nostrand Reinhold (1989), page 773. The Coriolis effect causes an object that is moving in a rotating frame of reference to experience a Coriolis force F:

$$F = k(4\pi/T)mv \quad (1)$$

where k is a constant of proportionality, T is the rotation period of the reference frame, m is the mass of the object and v is the velocity of the object. The direction of the Coriolis force is orthogonal to the velocity and rotation directions of the object. Thus, when member 6 is displaced at velocity v along direction 12, while the structure 10 is rotating at a rotation rate $\Omega$, member 6 will experience a Coriolis force along direction 16. Since member 6 is mechanically coupled to member 8, the entire structure 10 experiences the Coriolis force, causing it to vibrate along direction 16 (a direction orthogonal to the vibration direction 12 of member 6).

A vibration sensor 26 senses vibrations along direction 16, and a processor 28 derives the structure's 10 rate of rotation from their amplitude. Members 6 and 8 preferably have resonant frequencies that are substantially equal, and the vibrations induced in first member 6 are preferably at the members' resonant frequency.

Figure 2A:
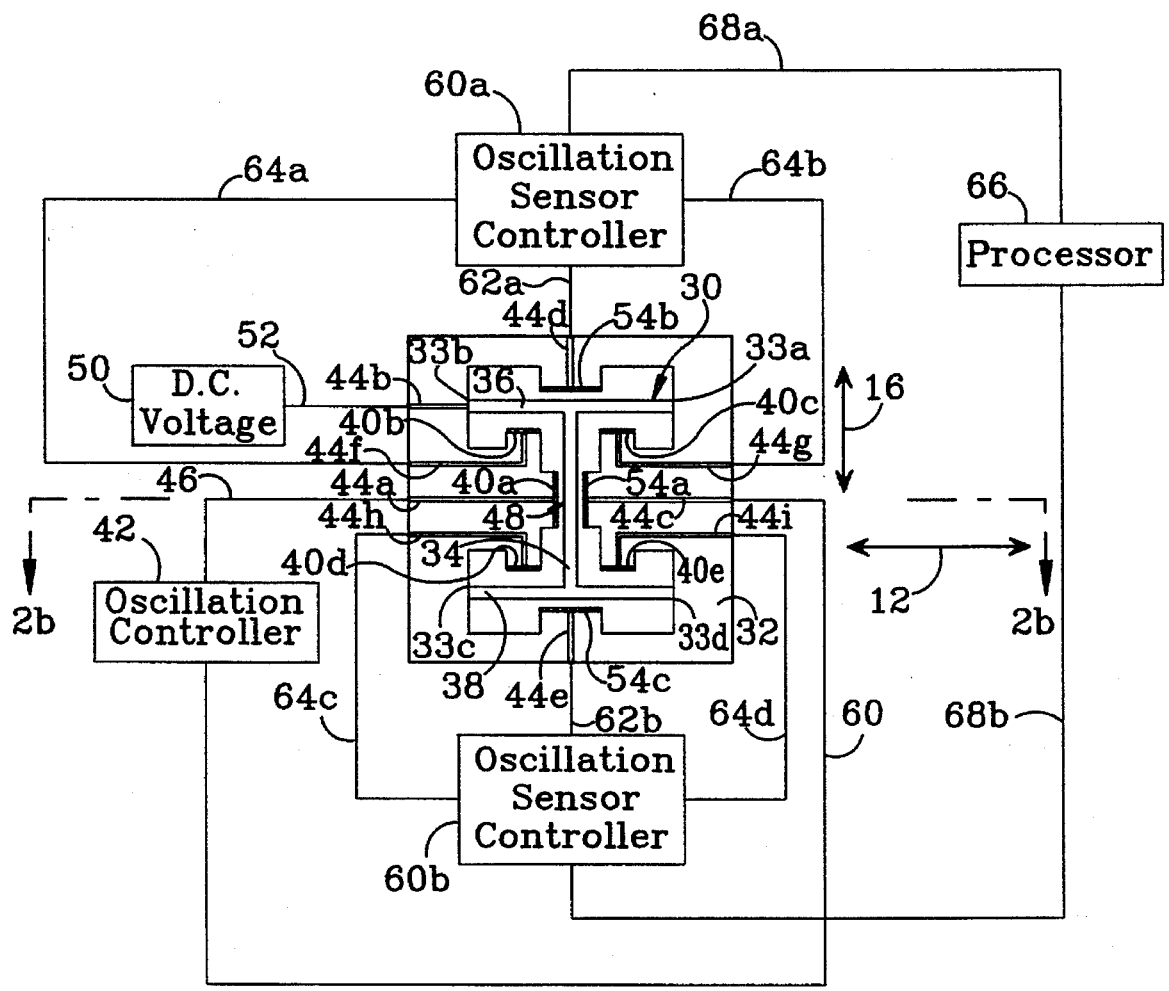
FIG. 2a is a combined elevation view and block diagram of a preferred embodiment of the invention.
Figure 2B:
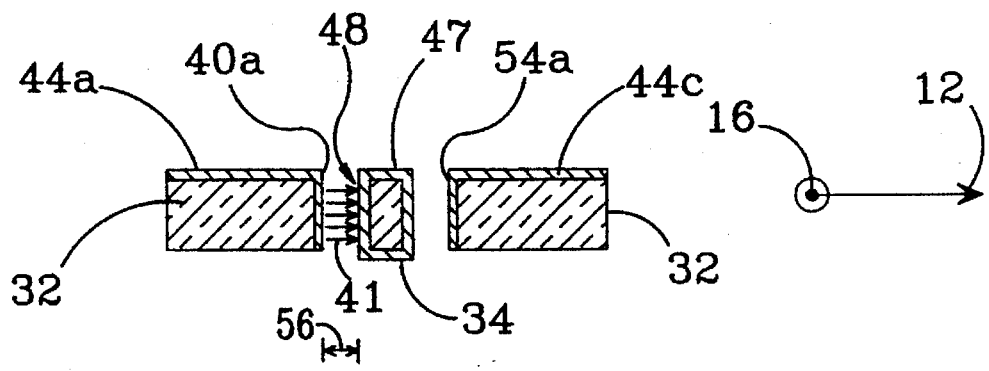

FIGS. 2a and 2b illustrate a preferred embodiment of the invention. The active area of the sensor is preferably an "T"-shaped structure 30 etched out from a substrate 32, with a first central member 34 and second and third transverse end members 36 and 38. Substrate 32 is preferably a dielectric material with a high mechanical Q, such as fused quartz, crystalline quartz or silicon. The substrate 32 is etched all the way through its depth, so that the structure 30 is supported only at four points 33a, 33b, 33c and 33d. This allows the central member 34 to flex along first and second directions 12 and 16 (x and y directions, respectively), and transverse end members 36 and 38 to flex only along y-direction 16. The structure 30 is preferably coated on all sides with a layer of electrically conductive material, preferably gold, for reasons that will be explained below.

In operation, oscillations are induced in central member 34 along x-direction 12 with a capacitive forcer electrode 40a, which is preferably an electrically conductive material. An oscillation controller 42 applies a time-varying voltage to forcer electrode 40a through conductive trace 44a and signal line 46, and a DC bias voltage is applied to the entire electrically conductive structure 30 by a DC voltage source 50 through signal line 52 and conductive trace 44b.

The operation of the forcer electrode is illustrated in FIG. 2b. Since the structure 30, and therefore the central member 34, is coated with a layer of electrically conductive material 47, the forcer electrode 40a and an adjacent area 48 of the central member 34 form a parallel plate capacitor. The time-varying voltage applied to forcer electrode 40a results in a time-varying electric field 41 between it and the central member 34. The resulting force on the central member 34 causes it to flex along the x-direction 12. A capacitive pickoff electrode 54a senses the displacement of the central member 34 and provides feedback to the oscillation controller 42 through conductive trace 44c and signal line 60 (see FIG. 2a). The pickoff electrode 54a and the central member 34 also form a parallel plate capacitor whose capacitance varies as the distance between the pickoff electrode 54a and the central member 34 varies. Since a DC bias voltage is present on the central member's electrically conductive layer 47, the varying capacitance causes a variation in the electrical signal sent to the oscillation controller 42.

The oscillation controller 42 preferably adjusts the frequency and amplitude of the time varying voltage applied to forcer electrode 40a to induce fixed amplitude flexural oscillations in the central member 34 at its resonant frequency. The amplitude of the oscillations are preferably controlled so that the maximum displacement of the first member 34 does not exceed 10 percent of the gap 56 between it and the forcer electrode 40a.

Referring back to FIG. 2a, rotating the sensor about a rotation axis that passes through structure 30 or substrate 32, and that is orthogonal to directions 12 and 16, results in a Coriolis force along y-direction 16. As explained above, directions 12 and 16 are defined with respect to the structure's 30 reference frame, so that they rotate with it. The Coriolis effect causes the "T" structure 30, and therefore transverse end members 36 and 38, to oscillate along y-direction 16. The oscillations in members 36 and 38 are sensed by capacitive pickoff electrodes 54b and 54c, respectively, which operate in the same manner as pickoff electrode 54a. The signals from electrodes 54b and 54c are sent to oscillation sensor controllers 60a and 60b through conductive traces 44d and 44e, and signal lines 62a and 62b, respectively.

Sensor controller 60a sends a voltage to capacitive forcer electrodes 40b and 40c through signal lines 64a and 64b, and conductive traces 44f and 44g, respectively, in response to the signal from pickoff electrode 54b. The sensor controller 60a adjusts the frequency and magnitude of the voltage so that the oscillations in member 36 are nulled by forcer electrodes 40b and 40c. Similarly, sensor controller 60b nulls the oscillations in member 38 by sending a voltage to capacitive forcer electrodes 40d and 40e through signal lines 64c and 64d, and conductive traces 44h and 44i, respectively, in response to the signal from pickoff electrode 54c. Sensor controllers 60a and 60b are connected to processor 66 through signal lines 68a and 68b, respectively, which is calibrated to derive the rate of rotation from the amount of voltage required to null the oscillations in members 36 and 38. Although sensor controllers 60a and 60b are shown as separate sensor controllers, they may be implemented with a single closed-loop proportional plus integral controller, such as those disclosed in Katsuhiko Ogata, *Modern Control Engineering,* Prentice-Hall (1970), pp. 156, 182 and 183.

Figure 3:
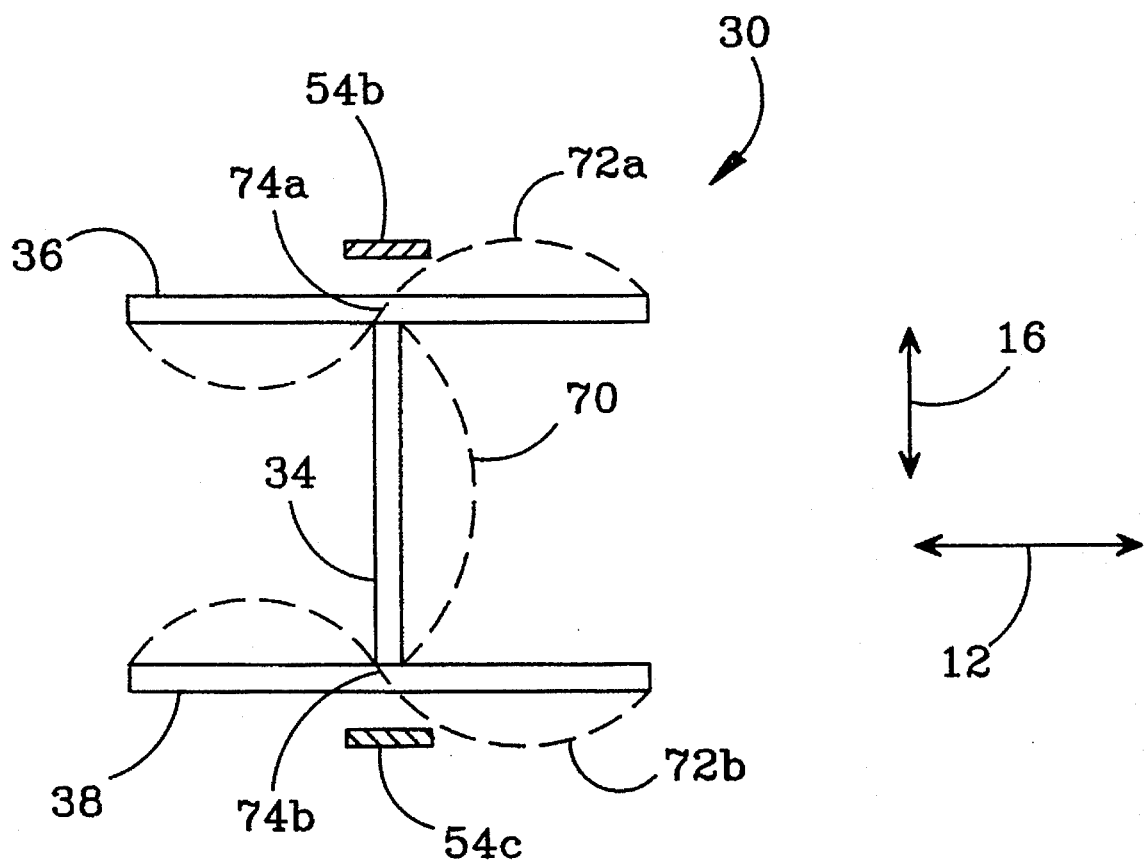

For improved sensor performance, it is preferable for pickoff electrodes 54b and 54c to sense only the oscillations that are coupled to transverse end members 36 and 38 through the Coriolis effect. However, as illustrated in FIG. 3, the finite stiffness of structure 30 causes members 36 and 38 to flex along direction 16 (represented by dashed lines 72a and 72b, respectively) when member 34 flexes along x-direction 12 (represented by dashed line 70). The compensate for this undesirable flexure, pickoff electrodes 54b and 54c are preferably placed at a symmetrical position with respect to inflection points 74a and 74b, respectively. Since the flexure on each side of inflection points 74a and 74b are in opposite directions, the undesirable flexure signal sensed by pickoff electrodes 54b and 54c average to substantially zero. In addition, flexures 72a and 72b are 180 degrees out of phase with respect to each other. This can be used to further cancel the unwanted signals by combining the signal outputs from oscillation sensor controllers 60a and 60b at processor 66 (in FIG. 2).

Figure 4:
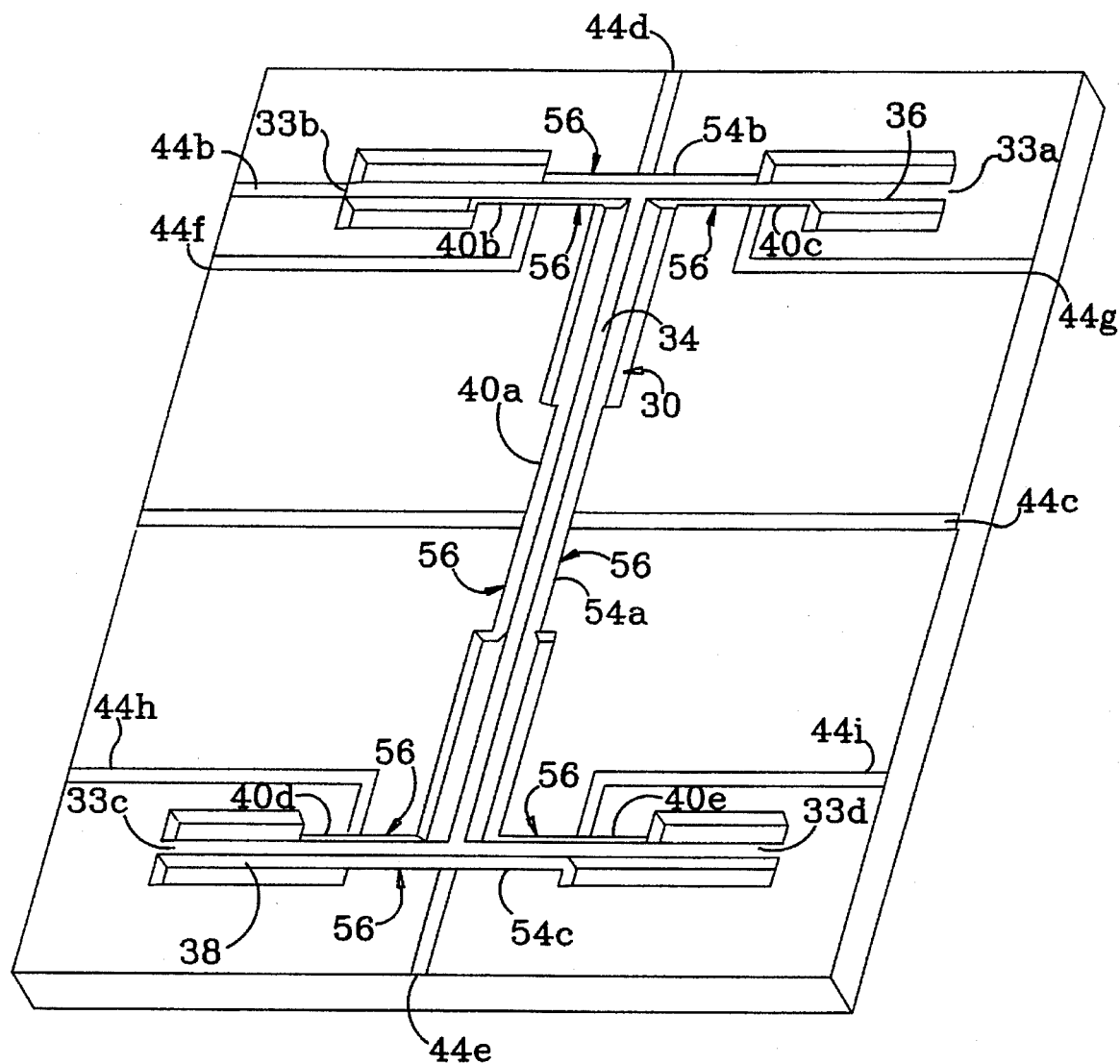
FIG. 4 is a perspective view of the embodiment of FIG. 2a, without the associated electronics and signal lines.

FIG. 4 is a perspective view of the preferred sensor embodiment without the associated electronics and signal lines. The sensor is preferably fabricated using standard substrate processing techniques. The substrate 32 is preferably a 0.7 cm×0.89 cm×0.03 cm wafer of dielectric material with a high mechanical Q, preferably fused quartz. Standard photolithographic techniques are used to construct a mask (not shown) which covers all of the surfaces of the starting substrate 32, except at the locations of the desired gaps between the structure 30 and the rest of the substrate 32. Plasma or ion mill etching is used to remove the exposed substrate material, leaving behind the "I"-shape d structure 30 attached at points 33a, 33b, 33c and 33d. Members 34, 36 and 38 are preferably 0.1 mm wide, and the gaps 56 between the electrodes and the structure 30 are preferably 0.03 mm wide. All other gaps between the structure 30 and the rest of the substrate 32 are preferably 0.38 mm wide.

A second photolithographic mask (not shown) is used to mask the substrate 32, except for the structure 30 and the eventual locations of the forcer and pickoff electrodes 40a, 40b, 40c, 40d, 40e, 54a, 54b and 54c, and the locations of the conductive traces 44a, 44b, 44c, 44d, 44e, 44f, 44g, 44h and 44i. Standard physical vapor deposition techniques are used to metallize the structure 30, the electrode locations and the conductive trace locations, preferably with a 5.0 nm thick layer of titanium followed by 5.0 nm thick layers of palladium and gold. Forcer electrode 40a and pickoff electrodes 54a, 54b and 54c are preferably 1.5 mm long, while forcer electrodes 40b, 40c, 40d and 40e are preferably 0.9 mm long.

Figure 5:
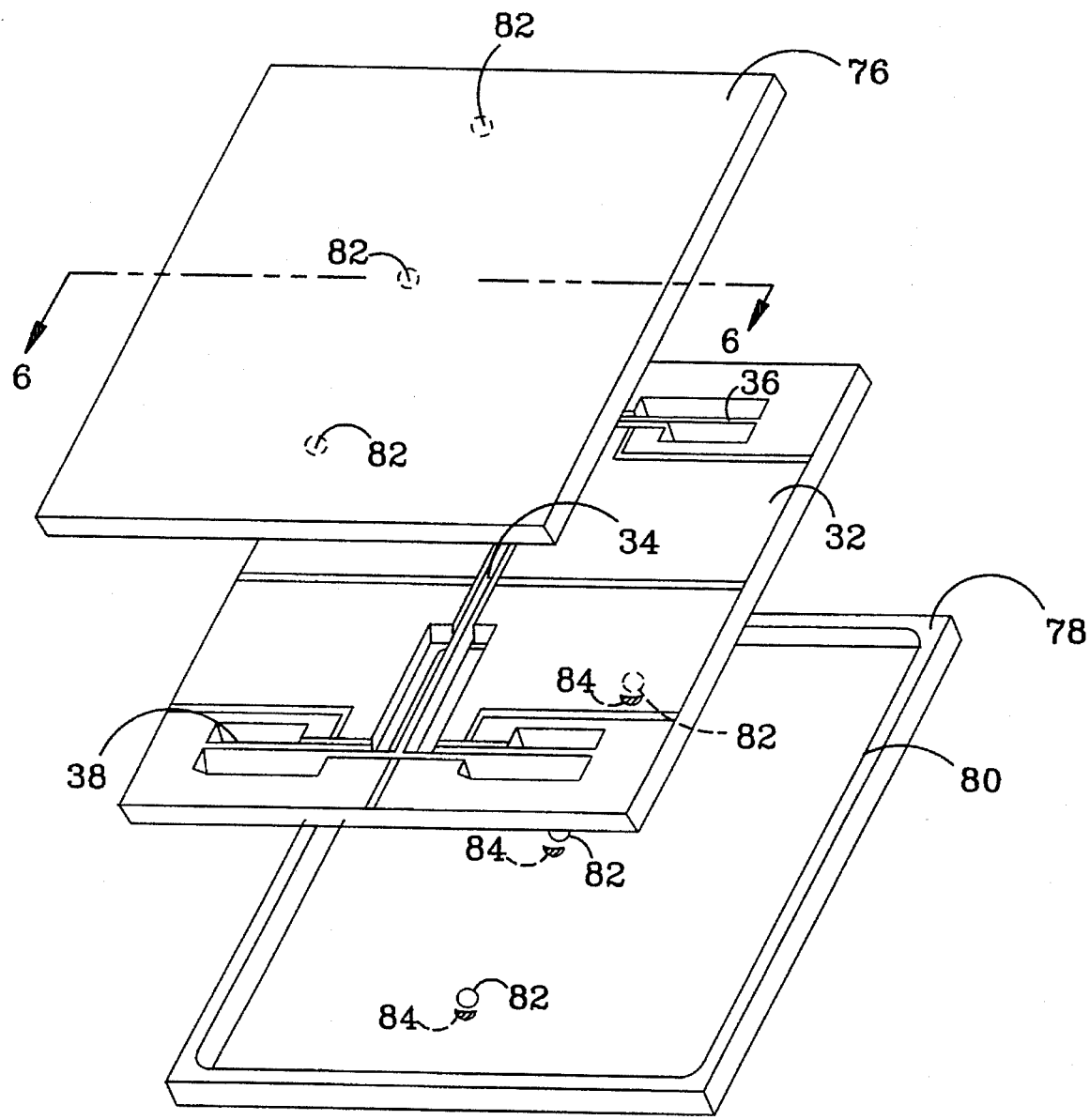

In the preferred embodiment, structure 30 is enclosed in an evacuated enclosure, as illustrated in FIG. 5. Top and bottom covers 76 and 78, preferably dielectric, are used to enclose structure 30. The length and width of the covers preferably match the length and width of substrate 32. A lip 80 is provided along the periphery of both covers to provide clearance for the structure 30 after the covers have been attached to the substrate 32. The depth of lip 80 is made large enough so that structure 30 does not mechanically contact covers 76 and 78 after they are attached to substrate 32. The covers are attached to substrate 32 in a vacuum environment using a vacuum tight sealing technique, preferably standard glass frit bonding techniques.

As mentioned above, the performance of the sensor is improved by matching the resonant frequencies of members 34, 36 and 38 as closely as possible. Since a member's resonant frequency is dependent upon its mass, there will be some resonant frequency mismatch between members as a result of tolerances in the photolithographic mask and etching processes. After fabrication, the resonant frequency of a member may be tuned by either removing or adding a sufficient amount of mass. For example, mass may be removed from one of the members by etching.

In the preferred embodiment, one or both of the covers 76 and 78 incorporate a resonant frequency tuning mechanism. The tuning mechanism preferably comprises a plurality of cavities 82 on the inside surface of one or both of the covers with metallic material 84, preferably gold, disposed inside them. The cavities 82 do not extend all the way through the cover. Each of the cavities 82 are positioned so that its respective metallic material 84 will be deposited on at least one of the members when the metallic material 84 is evaporated. In the preferred embodiment, three cavities 82 are placed on the inside surface of each of the covers 76 and 78. The cavities 82 are positioned directly above and below the centers (lengthwise) of each member in the structure 30.

Figure 6:
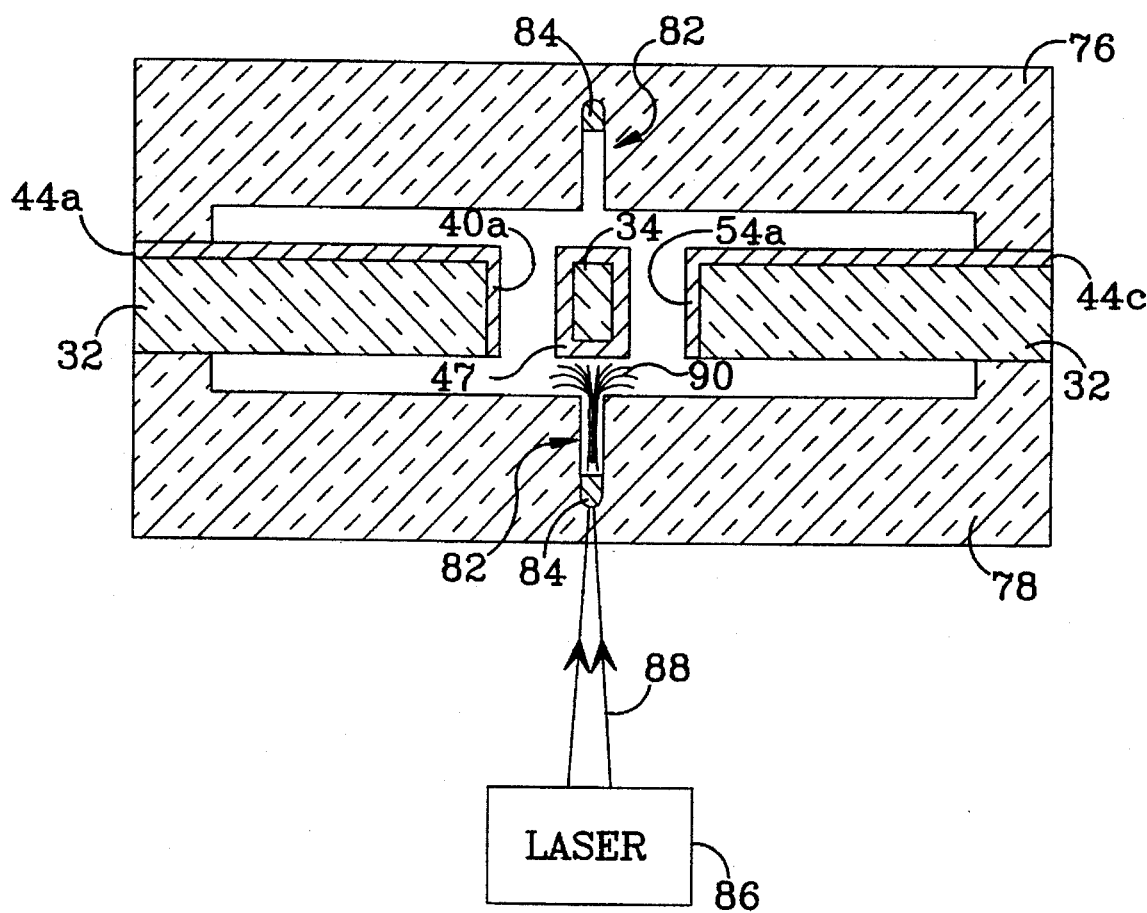
FIG. 6 is a sectional view taken along the section line 6—6 of FIG. 5.

FIG. 6 is a sectional view of the sensor taken along the section line 6—6 of FIG. 5, with covers 76 and 78 attached. The diameters of the cavities 82 are preferably ½ the width of the members (member 34 is shown), and their depths are preferably 5 times the width of the members. The bottom 0.1 mm of each cavity is filled with a gold slug 84 before the covers 76 and 78 are attached to substrate 32. The gold 84 is adhered by melting it in place.

The cover material is preferably chosen so that it is optically transparent at a predetermined laser wavelength. When the resonant frequency of a member needs to be tuned, a laser 86 that generates an optical beam 88 at the predetermined wavelength is used to heat and evaporate the gold 84 in a cavity that is directly above or below the member. If fused quartz or silica is used as the cover material, an Nd:YAG laser operating at 1.06 microns is the preferred laser 86. The optical beam 88 is focused through the cover 78 onto the gold slug 84. The evaporated gold 90 deposits on the member 34 and increases its mass. Other heating methods, such as an external inductive coil which couples to with the gold slug 84, may be used to evaporate the gold. The sensor may be operated during the tuning process.

Numerous variations and alternate embodiments will occur to those skilled in the art without departing from the spirit and scope of the invention. Although an "I"-shaped structure is described, other structure shapes, such as a "T" shape, may be used, as long as orthogonal vibration modes can be induced and isolated from each other. In addition, although fused quartz is used as the substrate wafer material in the preferred embodiment, crystalline quartz or silicon wafers may be used (with chemical etchants used for their processing). Furthermore, although oscillation sensing is accomplished with DC biased capacitive pickoffs in the preferred embodiment, other types oscillation sensors may be employed, such as high frequency carrier signal capacitive pickoffs (which operate without a DC bias voltage) and tunneling current displacement sensors. Such variations and alternate embodiments are contemplated, and can be made without departing from the spirit and scope of the appended claims.

We claim:

1. A sensor for sensing the Coriolis effect, comprising:

a mechanical structure, consisting of a base, a longitudinal member and one or more transverse members, said one or more transverse members being attached at their centers to the ends of said longitudinal member, said one or more transverse members and said longitudinal member lying in a plane, the ends of said one or more transverse members and any end of said longitudinal member not attached to a transverse member being attached to said base, a vibration generator for generating vibrations in said longitudinal member along an x-direction, said x-direction being in the plane of said one or more transverse members and said longitudinal member and parallel to said transverse members, and a vibration sensor for sensing vibrations in said one or more transverse members along a y-direction, said y-direction being in the plane of said one or more transverse members and said longitudinal member and parallel to said longitudinal member, said x-direction vibrations causing said one or more transverse members to vibrate along said y-direction when said base is rotated about a rotation axis that is orthogonal to said x and y-directions as a result of the Coriolis force exerted on said longitudinal member.

2. The sensor of claim 1, further comprising a processor connected to said vibration sensor for calculating said structure's rate of rotation from said y-direction vibrations.

3. A rotation sensor, comprising:

a base, a first member oriented parallel to a y-direction, an oscillation generator positioned to initiate and maintain flexural oscillations in said first member at a driving frequency along an x-axis normal to the first member, the first member having a resonant frequency, the driving frequency being substantially equal to the resonant frequency of the first member, at least one other member oriented parallel to the x-axis and attached at its center to an end of said first member, said at least one other member and said first member lying in a plane, any end of said first member not attached to another member and the ends of said at least one other member being attached to the base, said at least one other member having a resonant frequency substantially equal to the resonant frequency of said first member, said x-direction flexural oscillations inducing a Coriolis force along y-direction when said base is rotated about a rotation axis that is orthogonal to said x and y directions, thereby causing flexural oscillations along said y-direction in said at least one other member, at least one oscillation sensor for sensing the amplitude of said at least one other member's flexural oscillations along said y-direction, and a processor for calculating said rate of rotation about said rotation axis from the amplitude of said flexural oscillations along said y-direction.

4. The sensor of claim 3, wherein said first member comprises a first central member, and said at least one other member comprises second and third transverse members that are mechanically coupled to said first central member to form an "T"-shaped structure.

5. The sensor of claim 4, wherein said base and said first, second, and third members are etched from a dielectric substrate, said base and said first, second, and third members forming a monolithic structure.

6. The sensor of claim 5, wherein said first, second, and third members are coated with an electrically conductive material, and said oscillation generator comprises;

a first capacitive forcer electrode positioned on said substrate to apply an electric force to said first member along said x-direction, a first capacitive pickoff electrode positioned on said substrate to sense the flexure of said first member along said x-direction, and an oscillation controller for varying the electric force applied by said forcer electrode in response to feedback from said pickoff electrode, so that a constant amplitude flexure oscillation is set up in said first member at said first member's resonant frequency.

7. The sensor of claim 5, wherein said at least one oscillation sensor comprises:

second and third capacitive pickoff electrodes positioned on said substrate to sense flexural oscillations in said second and third members, respectively, along said y-direction, second and third capacitive forcer electrodes positioned on said substrate to apply a compensating electric force to said second member along said y-direction, fourth and fifth capacitive forcer electrodes positioned on said substrate to apply a compensating electrical force to said third member along said y-direction, and an oscillation sensor controller for adjusting the electric force applied by said second, third fourth, and fifth capacitive forcer electrodes so that the flexural oscillations in said second and third members are nulled.

8. The sensor of claim 7, wherein said processor is calibrated to calculate the rate of rotation about said rotation axis from the amount of electric force required to null the flexural oscillations in said second and third members.

9. The sensor of claim 7, wherein said first, second, and third members are enclosed in an evacuated enclosure.

10. The sensor of claim 9, wherein said enclosure further comprises a tuning mechanism for tuning the resonant frequencies of said members, said tuning mechanism comprising:

a plurality of cavities on the inside surface of said enclosure, and metallic material disposed in said cavities, each of said cavities positioned so that its respective metallic material is deposited on at least one of said first, second, and third members when said metallic material is evaporated, thereby changing the mass and resonant frequency of said at least one member.

11. The sensor of claim 10, wherein said enclosure comprises a dielectric that is optically transparent at a predetermined optical wavelength so that said metallic material can be heated and evaporated by directing an optical beam to said material through said enclosure, thereby allowing in-situ frequency tuning of said first, second, or third member.

12. A method of measuring rotation rate about a rotation axis, comprising the steps of:

inducing vibrational oscillations in a first member along an x-direction that is orthogonal to said rotational axis, said first member mechanically coupled to at least one other member that is restrained so that it can only oscillate along a y-direction that is orthogonal to said rotation axis and said x-direction, sensing vibrational oscillations in the at least one other member that are induced along said y-direction by the Coriolis effect, and deriving the rate at which said members are rotated about said rotation axis from the amplitude of said oscillations along said y-direction, the term members denoting said first member and said at least one other member.

13. The method of claim 12, wherein said members are tuned so that they have substantially equal resonant frequencies.

14. The method of claim 12, wherein said oscillations are induced in said first member by:

applying a time-varying force to said first member along said x-direction, and monitoring said induced oscillations and adjusting said force to maintain a constant oscillation amplitude and an oscillation frequency substantially equal to said first member's resonant frequency.

15. The method of claim 12, wherein the oscillations along said y-direction are sensed by:

monitoring the amplitude of y-direction oscillations in said at least one other member, and applying a force to said at least one other member sufficient to null said y-direction oscillations.

16. The method of claim 15, wherein said rotation rate is derived from the amount of force required to null said oscillations in said at least one other member.

17. The method of claim 13, wherein said members are tuned by reducing the mass of at least one of said members.

18. The method of claim 13, wherein said members are tuned by adding mass to at least one of said members.

19. The method of claim 18, wherein mass is added to at least one of said members by:

enclosing said members in an evacuated enclosure, said enclosure having a plurality of cavities on its inside surface and metallic material disposed in said cavities, with each of said cavities positioned so that its respective metallic material is deposited on at least one of said members when said metallic material is evaporated, and evaporating the metallic material in at least one of said cavities until said members are tuned to substantially equal resonant frequencies.

20. The method of claim 19, wherein said members are enclosed in a dielectric enclosure that is optically transparent at a predetermined optical wavelength, and said metallic material is evaporated by heating it with an optical beam, at said predetermined wavelength, that is directed to said material through an outer surface of said enclosure.

21. The method of claim 20, wherein said members are enclosed in a dielectric enclosure that is optically transparent at approximately 1.06 microns and said metallic material is heated with a ND:YAG laser beam that is focused onto said material through said enclosure.

* * * * *